(12) United States Patent
Lafforthun

(10) Patent No.: US 6,618,982 B2
(45) Date of Patent: Sep. 16, 2003

(54) LOCKING DOOR MECHANISM FOR AN ANIMAL TRAP

(76) Inventor: David W. Lafforthun, P.O. Box 174 W. Galway Rd., Galway, NY (US) 12074

( * ) Notice: Subject to any disclaimer, the term of this patent is extended or adjusted under 35 U.S.C. 154(b) by 0 days.

(21) Appl. No.: 09/873,739

(22) Filed: Jun. 4, 2001

(65) Prior Publication Data

US 2002/0178647 A1 Dec. 5, 2002

(51) Int. Cl.[7] .................... A01M 23/18; A01M 23/00
(52) U.S. Cl. .................... 43/61; 43/58; 43/60
(58) Field of Search .................... 43/58, 60, 61, 43/62, 66, 67, 70; D22/119; 70/93, 94; 292/338, 339

(56) References Cited

U.S. PATENT DOCUMENTS

| | | | |
|---|---|---|---|
| 244,572 A | * 7/1881 | Elliott | 43/67 |
| 1,349,453 A | 8/1920 | Hall | |
| 1,453,796 A | * 5/1923 | Hovell | 43/61 |
| 1,739,097 A | * 12/1929 | Smith, Jr. | 292/338 |
| 1,793,773 A | 2/1931 | Brown | |
| 2,229,685 A | * 1/1941 | Swedenburg | 43/61 |
| 2,541,681 A | 2/1951 | Andrews | 43/61 |
| 2,587,349 A | 2/1952 | Mace | 43/76 |
| 3,585,750 A | 6/1971 | Routt | 43/61 |
| 3,913,258 A | 10/1975 | Souza et al. | 43/60 |
| 3,918,194 A | 11/1975 | Waske | 43/61 |
| 4,080,749 A | 3/1978 | Gilbaugh | 43/61 |
| 4,162,588 A | * 7/1979 | Wyant | 43/61 |
| 4,232,472 A | 11/1980 | Muelling | 43/61 |
| 4,471,721 A | * 9/1984 | Vail | 119/428 |
| 4,546,568 A | * 10/1985 | Seyler | 43/61 |
| 4,583,316 A | 4/1986 | Holtgrefe | 43/61 |
| 4,682,440 A | 7/1987 | Hunter | 43/61 |
| 5,115,595 A | 5/1992 | Garcia | 43/61 |
| 5,329,723 A | * 7/1994 | Liul | 43/61 |
| 5,341,592 A | 8/1994 | Lafforthun | 43/66 |
| 5,345,710 A | 9/1994 | Bitz | 43/61 |
| 5,809,688 A | 9/1998 | Wallen | 43/61 |
| 5,862,624 A | 1/1999 | Askins | 43/61 |
| 5,943,813 A | 8/1999 | Wang | 43/61 |
| 5,979,105 A | 11/1999 | Marks | 43/61 |
| 6,164,008 A | 12/2000 | Kelley | 43/61 |

* cited by examiner

*Primary Examiner*—Charles T. Jordan
*Assistant Examiner*—Tara M Golba
(74) *Attorney, Agent, or Firm*—Heslin Rothenberg Farley & Mesiti P.C.; John Pietrangelo

(57) ABSTRACT

A door lock mechanism for an animal trap, an animal trap, and a method of capturing animals, typically, rodents and small animals. The door locking mechanism, trap and method employ a gravity-driven door and lock used for a door having a ledge and two bars that are pivotally mounted above the door. When activated by a release mechanism, the door and bars pivotally deflect whereby the bars engage the ledge on the closed door and prevent the door from being opened. The door lock mechanism may be used on any size and shape trap, but one typical trap for which the mechanism can be used is disclosed. A trap entrance arrangement having a conduit for leading animals to the entrance of a trap, that can be used with or without the disclosed door lock mechanism, is also provided.

29 Claims, 5 Drawing Sheets

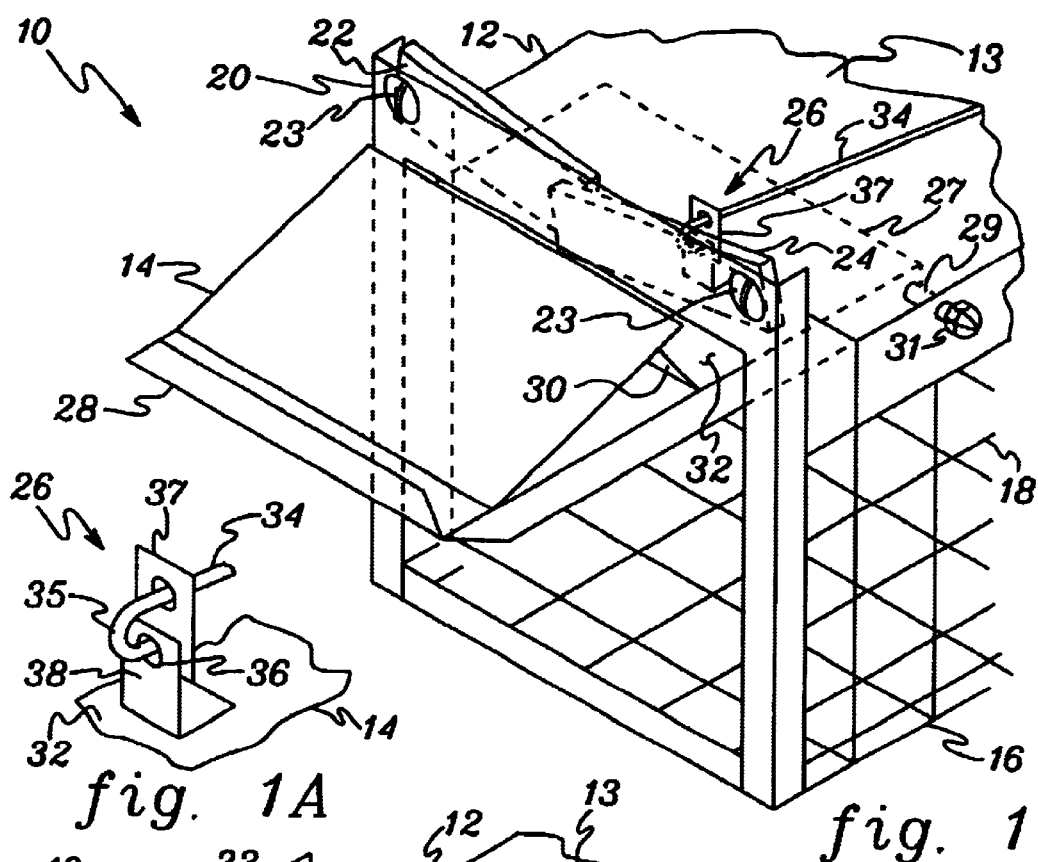
fig. 1A
fig. 1
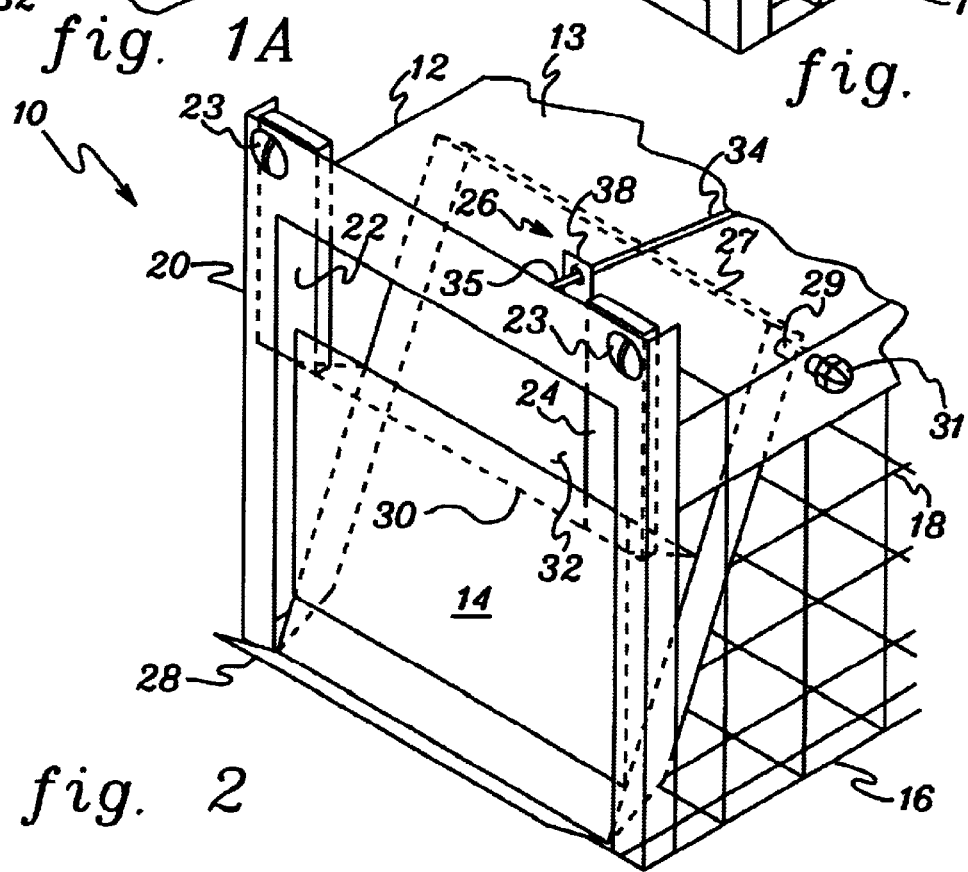
fig. 2

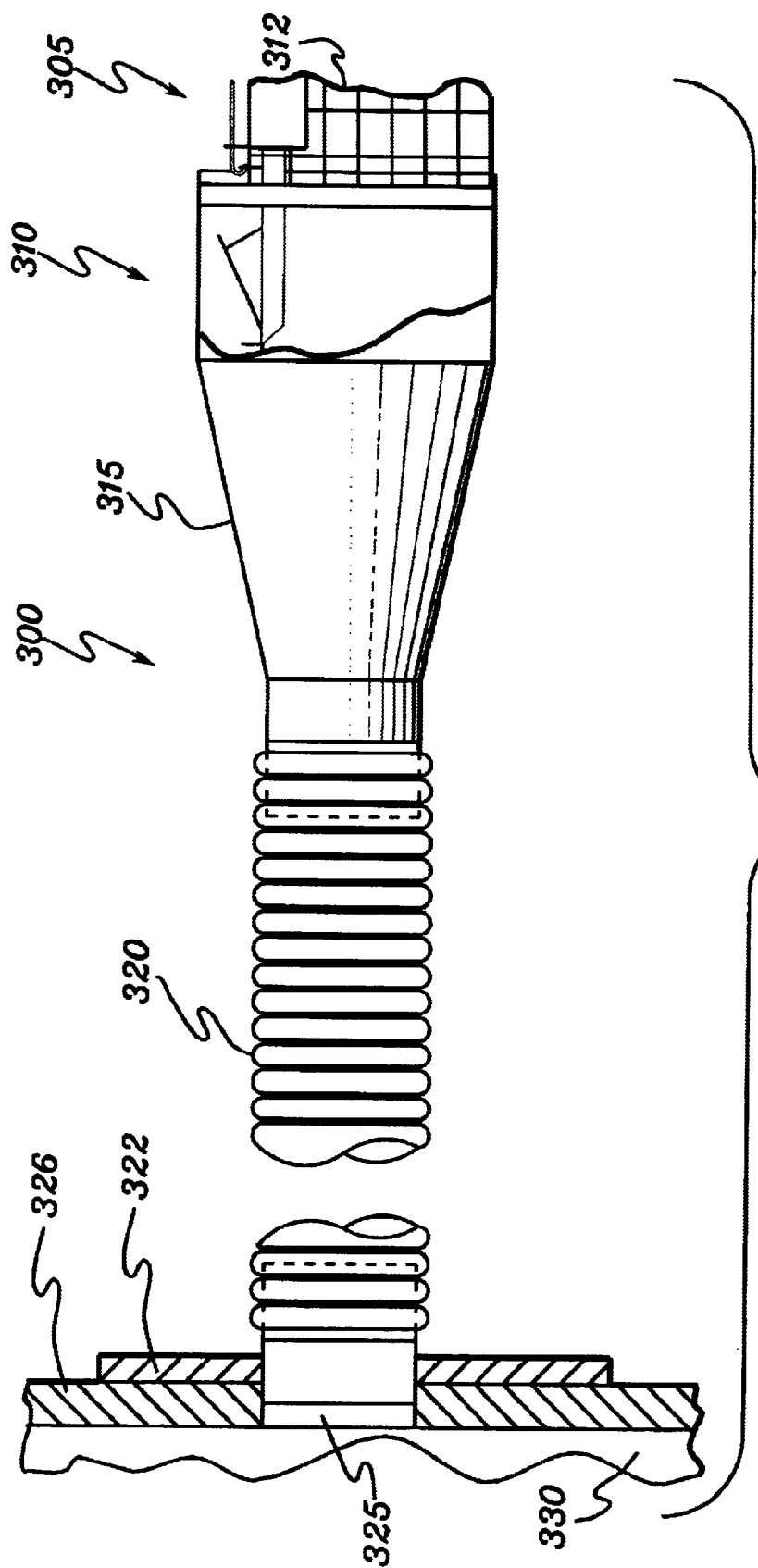

LOCKING DOOR MECHANISM FOR AN ANIMAL TRAP

TECHNICAL FIELD

The invention relates in general to a door mechanism for an animal trap, and more particularly to a door mechanism that upon release closes the door of the trap and then provides a restriction to prevent opening the door of the trap.

BACKGROUND OF THE INVENTION

From time immemorial humans have sought better ways of removing unwanted animals from inhabited areas. Mice, rats, and other rodents, as well as wild animals, such as, squirrels, feral cats, raccoons, all have been and will continue to be unwelcome guests for home owners and business owners alike. Many have sought methods and devices in attempting to address this problem, in fact, this pursuit is so well recognized in modern culture that the proverbial "better mouse trap" has become associated with virtually any creative pursuit.

Animal traps, including mouse traps, exist which permit the humane capture of animals. Humane capture is especially desirable for the trapping of rodents, such as mice or rats, that may inhabit human dwellings. Numerous types of traps have been devised which effect the capture of animals without injury to the animal (see, for example, U.S. Pat. Nos. 2,478,605; 2,524,504; 3,975,857; and 4,682,440. Many of these traps have intricate designs that are therefore not suitable for manufacture on a large scale. In addition, even if a locking mechanism is provided, such mechanisms are also intricate and thus also unsuitable for manufacture on a large scale or simply do not adequately retain the captured animal or are cumbersome to operate by the user of the trap.

Consequently, a need continues to exist for an animal trap which is both safe and effective in the humane capture of animals, especially rodents, is readily manufacturable, as well as provides a simple and effective door locking mechanism. One such animal trap that provides many of these features is disclosed in copending U.S. patent application Ser. No. 09/837,605 filed on Apr. 18, 2001 [agent ref. 0069.008], the entire disclosure of which is incorporated by reference herein. The present invention provides further advancements in the art, especially to the art of door locking mechanisms for animal traps.

SUMMARY OF THE INVENTION

The present invention provides methods and apparatus which address many of the limitations of prior art methods and apparatus. One aspect of the present invention is a door mechanism for an animal trap comprising: a door having a top and a bottom, the door pivotably mounted at the top to an enclosure and having a ledge, the door having an open position and a closed position; at least one bar pivotally mounted above the door; means for holding the at least one bar in a first position when the door is in the open position; and means for restraining the door in the open position; wherein when the means for restraining the door is released, the door pivotally deflects to the closed position and the at least one bar pivotally deflects to a second position whereby the at least one bar engages the ledge on the door and prevents the door from being opened. The at least one bar is preferably at least two bars. The first position of the at least one bar is generally horizontal and the second position is generally vertical. Typically, when the door is in the closed position, the ledge is generally horizontal. In addition, the means for restraining the door in the open position may typical be a linkage mechanism connected to a release mechanism.

Another aspect of the present invention is an animal trap comprising: an enclosure having a top, a bottom, side walls, and an entrance; a door having a top and a bottom, the door pivotably mounted at the top to the side walls adjacent the entrance and the door having a ledge; at least one bar pivotably mounted above the door; means for holding the at least one bar in a first position; means for restraining the door in an open position; and means for releasing the door when an animal enters the enclosure; wherein, when the means for restraining the door is released, the door closes and the at least one bar pivotably deflects to a second position and engages the ledge of the door and prevents the door from opening. Again, the at least one bar is typically at least two bars and the first position of the at least one bar is generally horizontal and the second position is generally vertical. Furthermore, when the door is closed, the ledge of the door is generally horizontal and the second position of the at least one bar is a generally vertical position and the end of the at least one bar bears against the ledge of the door to prevent the door from opening.

A further aspect of the present invention is a method of trapping animals using a trap having an enclosure and a door mechanism, the door mechanism comprising: a door having a top and a bottom, the door pivotably mounted at the top to the enclosure and having a ledge, the door having an open position and a closed position; at least one bar pivotally mounted above the door; means for holding the at least one bar in a generally horizontal position above the door when the door is in the open position; and a means for restraining the door in the open position, the means for restraining being operatively connected to a release mechanism in the enclosure; the method comprising: restraining the door in the open position; attracting a animal into the enclosure whereby the animal contacts and activates the release mechanism; closing the door; pivotally rotating the at least one bar from a generally horizontal position to a generally vertical position; preventing the door from opening by engaging the ledge of the door with the at least one bar. In one aspect, both closing the door and pivotally rotating the at least one bar is practiced using only gravity.

A still further aspect of the invention includes a trap for capturing animals exiting a cavity, the trap comprising: an enclosure having an entrance; and a conduit communicating between the cavity and the entrance of the enclosure. The cavity may be a building, a structure, a hole, a lair, a burrow, or any other type of enclosure. The trap preferably includes some form of transition piece positioned between the conduit and the entrance. The conduit is typically circular and the entrance is typically rectangular and the transition piece transitions from a circular shape to a rectangular shape. The trap may be used for capturing flying, for example, birds, and non-flying animals, for example, ground-dwelling animals, for example, rodents, squirrels, opossums, groundhogs, beaver, and snakes.

These and other embodiments and aspects of the present invention will become more apparent upon review of the attached drawings, description, and claims.

BRIEF DESCRIPTION OF THE DRAWINGS

The subject matter which is regarded as the invention is particularly pointed out and distinctly claimed in the concluding portion of this specification. The invention, however, both as to organization and method of practice, together with further objects and advantages thereof, may best be understood by reference to the following detailed descriptions of the preferred aspects and the accompanying drawings in which:

FIG. 1 illustrates a perspective view, partially in cross-section, of one aspect of the present invention in the open position.

FIG. 1A illustrates a detailed view of one door support and release mechanism that can be used for the aspect of the invention shown in FIG. 1.

FIG. 2 illustrates a perspective view, partially in cross-section, of one aspect of the present invention in the closed position.

FIG. 6 illustrates a side view of another aspect of the present invention.

DETAILED DESCRIPTION OF THE PREFERRED EMBODIMENTS

Figure 3A:
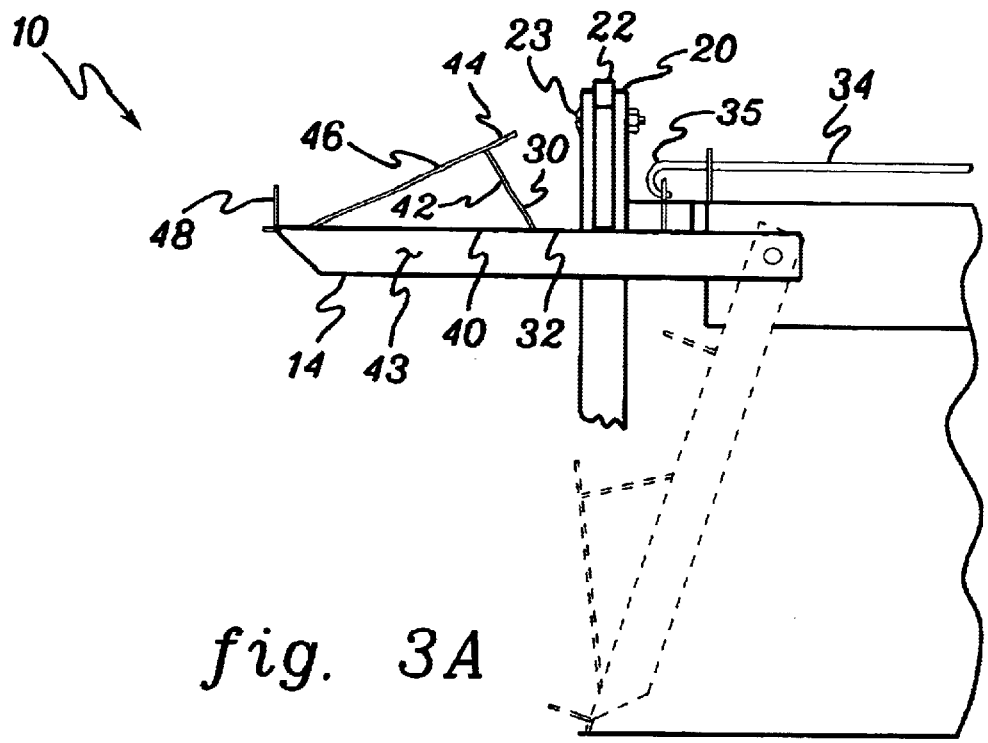
FIG. 3A illustrates a side view of the aspect of the invention shown in FIG. 1.

FIGS. 1 and 2 illustrate perspective views of door mechanism 10 for an animal trap according to one aspect of the present invention. The door mechanism 10 is marketed under the name Shur-Lock™ by DWL Brand Manufacturing of Galway, N.Y. In FIG. 1 door mechanism 10 is open or in the opened or set position; in FIG. 2, door mechanism 10 is closed or in the released or closed position. Door mechanism 10 may be mounted to any enclosure 12, of which only a partial view is shown in FIGS. 1 and 2. Enclosure 12 may take any desirable size and shape depending upon the size and number of animals intended to be captured within enclosure 12. Enclosure 12 typically includes a top 13, a bottom 16, and side walls 18. Top 13, bottom 16, and side walls 18 of enclosure 12 may be comprised of sheet metal, wire mesh, wood, aluminum, plastic, plastic mesh, or any other type of material that will form a barrier to the escape of an animal.

Door mechanism 10 includes a door 14, a frame 20, bars 22 and 24, and a door support and release mechanism 26. Door 14 includes a top 27 and a bottom 28 and is pivotally mounted to side walls 18 of enclosure 12. Door 14 pivotally rotates about an axis near top 27, for example, the axis defined by the rod 29 which is mounted to side walls 18 by means of cap nuts 31. According to one aspect of the present invention, door 14 includes at least one ledge or shelf 30, which is typically spaced from top 27. Frame 20 is typically a rigid rectangular structure that provides an entrance to enclosure 12 and also supports bars 22, 24. Frame 20 may be an integral part of enclosure 12 or may be a separate component mounted to enclosure 12. Bars 22 and 24 are pivotally mounted to frame 20, for example, by threaded fasteners 23. Though two bars 22, 24 are shown, the present invention may only include a single bar 22 or 24.

In configuration shown in FIG. 1, that is, in the set position, bars 22 and 24 are oriented in a generally horizontal position and are supported by the face 32 of door 14. By the expression "generally horizontal", it is to be understood that bars 22, 24 may not necessarily be truly horizontal when the door mechanism is in the open position. As shown in FIG. 1, bars 22, 24 may be slightly downwardly (or upwardly) canted and still effect the present invention. In configuration shown in FIG. 2, that is, in the released position, bars 22 and 24 are oriented in a generally vertical position. Again, by the expression "generally vertical", it is to be understood that bars 22, 24 may not necessarily be truly vertical when the door mechanism is in the closed position. For example, if ledge 30 of door 14 includes an inclined surface which can be restrained from movement, bars 22 and 24 may be assume an oblique orientation while still preventing door 14 from being opened. (See, for example, FIG. 4D). According to one aspect of the present invention, in the closed position shown in FIG. 2, bars 22 and 24 engage ledge 30 of door 14 whereby door 14 is provided with a positive locking mechanism. That is, door 14 is prevented from being opened due to bars 22 and 24 bearing against ledge 30.

Door support and release mechanism 26 provides a means for supporting door 14 of door mechanism 10 when the trap is set or open and a means for releasing or closing the door when an animal enters enclosure 12. Mechanism 26 may be any desirable combination of mechanical (including hydraulic or pneumatic) or electrical components which can support door 14 in the open position as shown in FIG. 1 and release door 14 so that it will close as shown in FIG. 2. One means 26 for supporting and releasing door 14 in the aspects of the invention shown in FIGS. 1 and 2 is shown in FIG. 1A. Door support and release mechanism 26 comprises a linkage, bar, or rod 34 having a hooked end 35 which engages an aperture 36 in a plate 38 mounted to face 32 of door 14, though other types of engagements may be used. Rod 34 may be slidably mounted by a support plate 37 which is mounted on housing 12. In a preferred aspect, mechanism rod 34 of mechanism 26 is operatively connected to a means for sensing or determining the presence of an animal in housing 12 and mechanism 26 releases door 14 in response to thereto. One preferred door support and release mechanism and a means for sensing the presence of an animal in housing 12 is discussed below with reference to FIG. 5.

In one aspect of the present invention, when the presence of an animal in enclosure 12 is sensed or determined, door support and release mechanism 26 releases door 14 so that door 14 closes, typically, under the force of gravity; bars 22, 24 rotate from the generally horizontal to the generally vertical position and engage ledge 30 in door 14; and the interference between ledge 30 and bars 22, 24 prevents the opening of door 14.

Figure 3B:
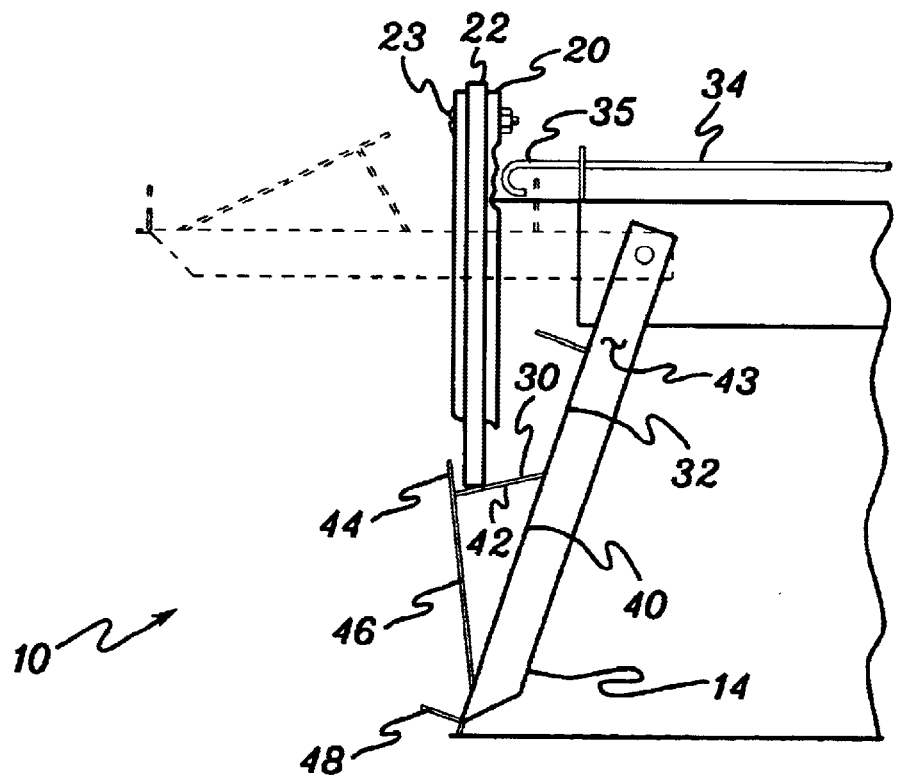
FIG. 3B illustrates a side view of the aspect of the invention shown in FIG. 2.

A detailed view of one profile of door 14 that may used to effect the present invention is illustrated in FIGS. 3A and 3B. FIG. 3A illustrates a side-elevation view of the door mechanism 10 shown in FIGS. 1 and 2 with the door mechanism 10 in the open position. FIG. 3B illustrates a side-elevation view of the door mechanism 10 shown in FIGS. 1 and 2 with the door mechanism 10 in the closed position. Door 14 of mechanism 10 typically includes a plate 40, having face 32, and a plate 42 mounted to plate 40 to provide ledge or shelf 30. Ledge 30 may have a lip 44. Though the ledge 30 shown in FIGS. 3A and 3B is located approximately at the midpoint of plate 40, ledge 30 may be located anywhere along plate 40, that is, anywhere from the top 27 to the bottom 28 (see FIG. 2). For instance, ledge 30 may be positioned at bottom 28 of plate 40 and also provide the function of a handle, for example, ledge 30 may replace the handle function of lip 48. Ledge 30 may be perpendicular to plate 40, but as shown in FIGS. 3A and 3B, ledge 30 is typically not perpendicular to plate 40, for example, ledge 30 may be non-perpendicular to plate 40 so that ledge 30 is inclined downward when door 14 is in the closed or released position, as shown in FIG. 3B. In the released position shown in FIG. 3B, plate 40 assumes an inclined orientation, that is, inclined at an angle of between about 70 to about 80 degrees from the horizontal. However, plate 40 may assume any angle from about 5 to about 90 degrees from the horizontal and still effect the desired invention.

Door 14 may also include a plate 46 mounted between plate 40 and plate 42 to support plate 42 and, among other things, provide a vertical surface to door 14 when door 14 is in the closed position. An extension of plate 46 beyond plate 42 may provide lip 44. Door 14 may also include a lip 48 that acts as a handle for manually opening door 14. As shown in FIG. 3A, in the open position, bars 22, 24 are supported by face 32 of plate 40. As shown in FIG. 3B, in the closed position, bars 22, 24 engage ledge 30 and prevent door 14 from being opened. Door 14 may also include side plates 43.

Figure 4A:
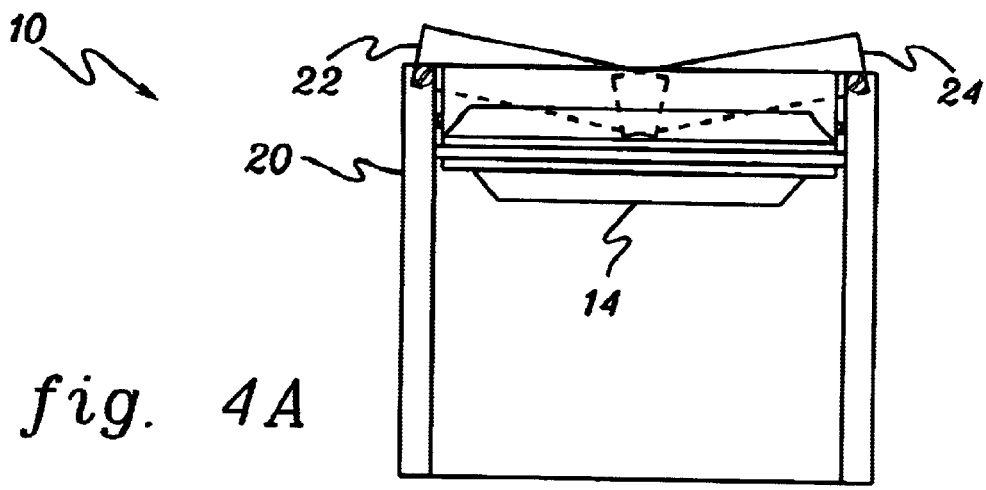
FIGS. 4A, 4B, and 4C illustrate front views of various aspects of the present invention shown in FIGS. 1 and 2.
Figure 4B:
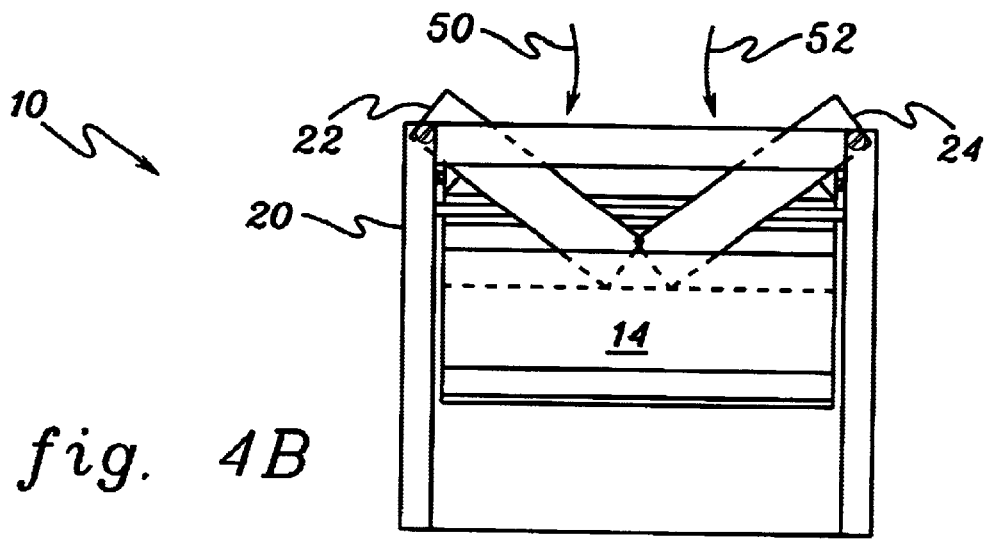
Figure 4C:
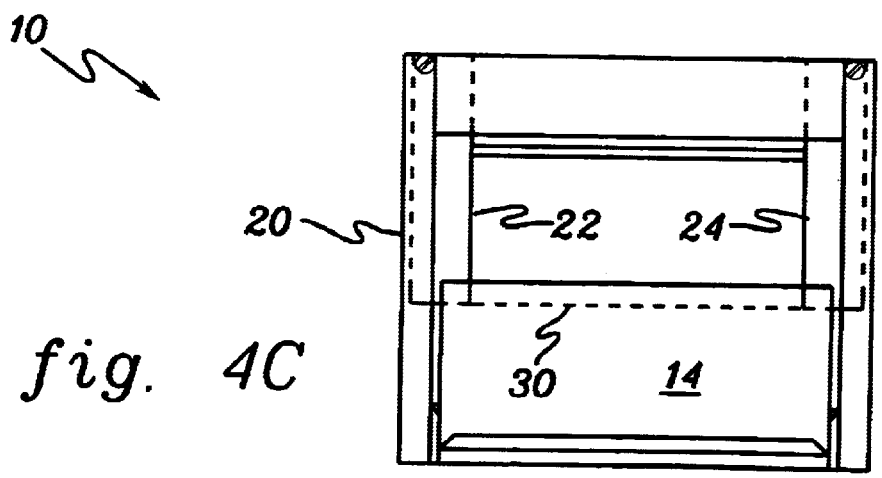
Figure 4D:
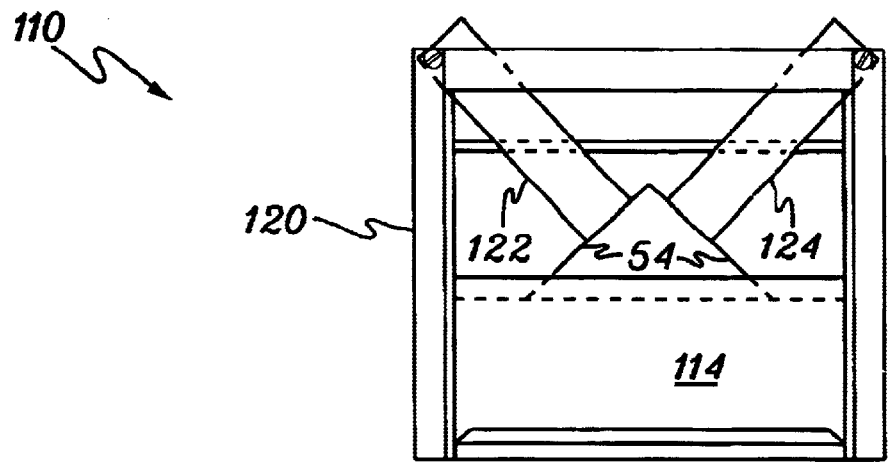
FIG. 4D illustrates a front view of another aspect of the present invention.

FIGS. 4A through 4C illustrate front elevation views of the door mechanism 10 of FIGS. 1 and 2 in various stages of activation according to one aspect of the present invention. In FIG. 4A, door mechanism 10 is in the set or open position. In this position, bars 22, 24 are supported in a generally horizontal position by door 14. In FIG. 4B, door mechanism 10 is in the process of closing after being released by door support and release mechanism 26. In this intermediate position, bars 22, 24 are pivotally deflecting in the direction of arrows 50 and 52, respectively, while bearing against face 32 of door 14. In FIG. 4C, door mechanism 10 is in the released or closed position. In this position, bars 22, 24 bear against ledge 30 and prevent door 14 from being opened. FIG. 4D illustrates an alternate embodiment 110 of the present invention in which door 114 is mounted on frame 120. Though similar in other respects to door 14, door 114 includes one or more ledges 54 that are inclined relative to frame 120. When bars 122, 124 rotatably deflect they bear against ledges 54 and prevent door 114 from being opened, even though bars 22, 24 are not oriented in a truly vertical position. Other modes of engaging at least one bar 22, 122 with door 14, 114 whereby door 14, 114 is prevented from opening will be readily apparent to those of skill in the art, and are within the scope of the present invention.

The length and width of bars 22, 24 are dependent upon the dimensions of the trap to which door mechanism 10 is applied. Bars 22, 24 are typically shorter in length than the width of the enclosure 12 so that bars 22, 24 can be positioned in a generally horizontal position when supported by door 14 in the set position, see FIG. 1. However, the length of bars 22, 24 is most dependent upon the elevation of ledge 30 on door 14. According to the present invention, the bars 22, 24 must be long enough to engage ledge 30 when oriented in the generally vertical position when door mechanism 10 is in the closed or released position, see FIG. 2. In one mode of the present invention, bars 22, and 24 are long enough to assume a truly vertical orientation when in the released position, so that the end of bars 22, 24 bear against ledge 30 and provide a positive stop to the opening of door 14, for example, as shown in FIG. 4C. Though the size of enclosure 12 and length of bars 22, 24 may vary from about 1 inch to about 10 feet, depending upon the size of the animal being trapped, the enclosure 12 and bars 22, 24 typically have dimensions between about 3 inches to about 2 feet.

The width and thickness of bars 22, 24, must also be sufficient to prevent the opening of door 14 when in the released position, as shown in FIG. 4C. For instance, when in the vertical orientation shown in FIG. 4C, the thickness and width of bars 22, 24 must be sufficient to prevent the lateral deflection of bars 22, 24, for example, due to axial column loading, that can be expected to be exerted by an animal trapped within enclosure 12. Again, though the width and thickness of bars 22, 24 may vary broadly, the width of bars 22, 24 is typically between about 0.125 inches and about 3 inches, and more preferably, about 0.25 to about 2 inches. The thickness of bars 22, 24 is typically between about 0.125 to about 1.0 inch. Bars 22, 24 are typically made from a material that can withstand the intended column loading without deflecting, and may be metallic, or non-metallic metallic (for example, plastic or wood), but are preferably metallic, for example, carbon steel, stainless steel, or aluminum. These materials are generally more cost effective for fabricating a device according to the present invention. Since, the weight of bars 22, 24 aids in deflecting door 14 when door 14 is released, a denser material, for example, steel, is a preferred material of manufacture for bars 22, 24.

Figure 5:
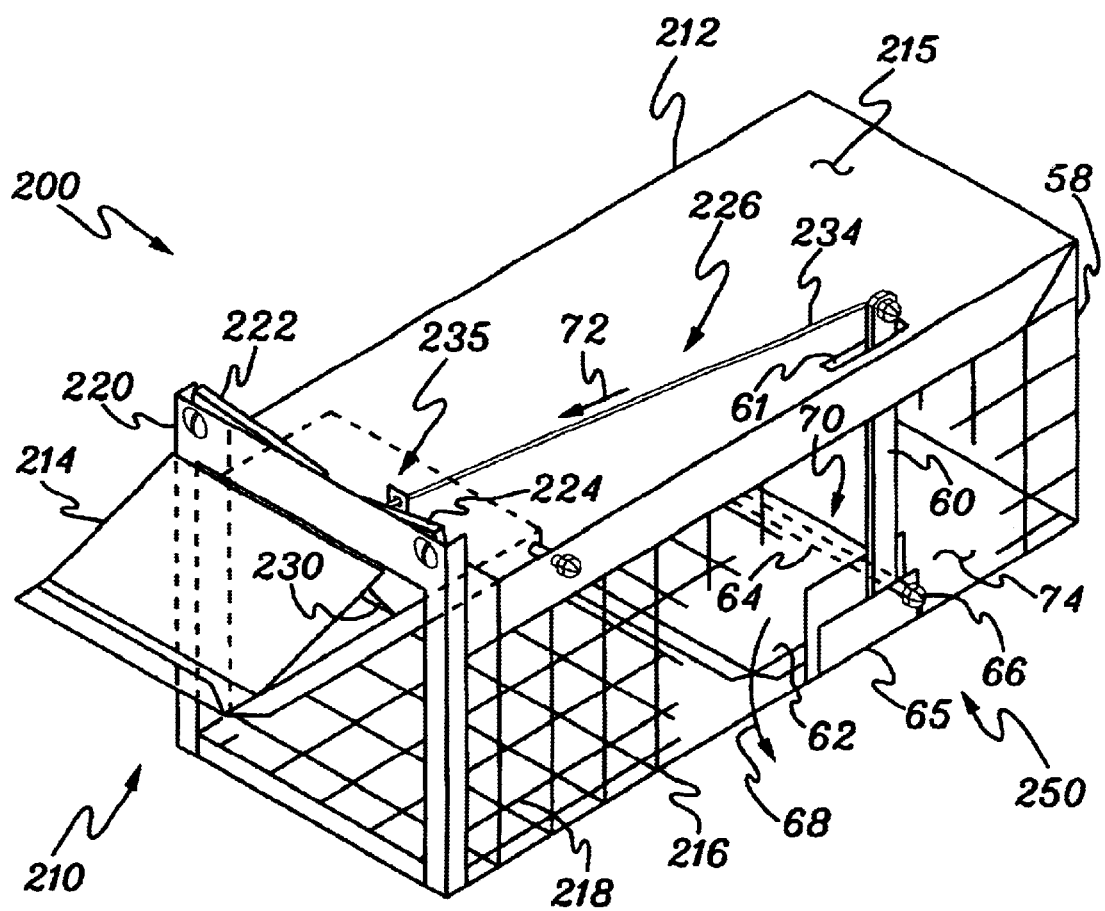
FIG. 5 illustrates a perspective view of another aspect of the present invention.

FIG. 5 illustrates a perspective view of a trap 200 incorporating a door mechanism 210 according to one aspect of the present invention. For ease of illustration, components illustrated in FIG. 5 which are essentially the same as those shown in FIGS. 1 and 2 have similar reference numbers but are prefaced by the numeral "2". Thus, FIG. 5 includes a door mechanism 210 having a door 214 having ledge 230, a frame 220, bars 222 and 224, and a door support and release mechanism 226. Door mechanism 210 is attached to an enclosure 212 which according to the present invention may be any type, size, or shape of enclosure for retaining captured animals. Enclosure 212 typically includes a top 215, a bottom 216, side walls 218, and an end wall 58. Though top 215 is made from solid plate and sidewalls 218, bottom 216, and end wall 58 are made of wire screen in FIG. 5, top 215, bottom 216, sidewalls 218, and end wall 58 may be made from wire screen, perforated or solid wood, perforated or solid metal plate, perforated or solid plastic sheet, or any other suitable material. Door mechanism 210 includes essentially all the features of door mechanism 10 illustrated in FIGS. 1 and 2, and operates in essentially the same fashion as described with respect to FIGS. 1, 2, 3A, 3B, 4A, 4B, and 4C.

One distinction between the aspects of the invention shown in FIGS. 1 and 2 and what is shown in FIG. 5, is the specific door support and release mechanism 226 having a means 250 for sensing the presence of an animal in housing 212. Door support and release mechanism 226 includes a linkage, bar, or rod 234 having a hooked end 235 which engages an aperture in a plate mounted to door 214 in essentially the same fashion as mechanism 26 shown in FIG. 1A, though other types of engagements may be used. Rod 234 is pivotally connected to linkage 60 which passes through an aperture 61 in top 214. Linkage 60 is rigidly mounted to platform 62 located in enclosure 212. The rigid mounting of linkage 60 to platform 62 may be by welding, for example, resistance welding, or by mechanical fastener, for example nuts and bolts. Platform 62 is pivotally connected to sidewalls 218, for example, via a rod 64 and cap nuts 66, though other types of pivotal connections may be used. If the sidewalls 218 comprise wire screen as shown in FIG. 5, plates 65 may be attached to sidewalls 218 for mounting rod 64. Platform 62 provides the trigger mechanism which activates the release mechanism 226 to close door lock mechanism 210.

According to one aspect of the present invention, when an animal enters enclosure 212 via open door mechanism 210, which is arranged in the set position, and impinges and deflects platform 62, in the direction shown by arrow 68, linkage 60 is deflected as indicted by arrow 70, and as a result deflects rod 234 as indicated by arrow 72. The deflection of rod 234 disengages hooked end 235 from door 214 (as shown in FIG. 1A) allowing door 214 to fall under its own weight and, typically, the weight of bars 222 and 224. As discussed above with respect to FIGS. 4A, 4B, and 4C, with the deflection of door 214 and bars 222, 224, bars 222, 224 engage the ledge 230 of closed door 214 and prevent door 214 from being opened. Enclosure 112 may include bait placed in a bait chamber 74 to aid in luring an animal into trap 200.

FIG. 6 illustrates a side elevation view, partially in cross-section of a trap entrance arrangement 300 according to another aspect of the present invention. Arrangement 300 includes a trap 305 having an entrance 310 and an enclosure 312, an entrance transition 315 and a conduit 320. Arrangement 300 may be used in conjunction with the door locking mechanisms 10, 110, 210 shown above, or with any other form of trap 305 having an enclosure 312 and an entrance 310. According to this aspect of the invention, conduit 320 provides a pathway for an animal from an opening 325 in a cavity 330. Cavity 330 may be a building, a structure, a hole, a lair, a burrow, another trap, or any other form of enclosure from which an animal may exit. Conduit 320 may be comprised of any conventional material, for example, conduit 320 may be metallic or non-metallic. Conduit 320 may be flexible or non-flexible, for example, stove pipe with one or more flexible joints. Typical non-metallic materials from which conduit 320 can be made include plastic (including PVC), rubber, and cloth, for example, spring-loaded cloth or fire hose. Conduit 320 may take any conventional cross-sectional shape, but conduit 320 is preferably circular in cross section. Conduit 320 may be permanently mounted to or detachable from transition 315, entrance 310, or enclosure 312. Conduit 320 may include at least one flange 322, which can easily be connected to the opening 325, for example, in cavity wall 326, and a flange (not shown) for attaching to transition 351, entrance 310, or enclosure 312 by means of conventional fasteners, for example, threaded fasteners. As shown in FIG. 6, conduit 320 may also slidably fit over the end of transition 315. Conduit 320 may be secured to transition 315 by means of conventional fasteners, for example, by means of a hose clamp.

Transition 315 adapts the geometry of conduit 320 to the geometry of the entrance 310. If the geometry of conduit 320 is already compatible with the geometry of entrance 310, for example, both are circular, square, or rectangular in cross section, no transition 315 may be needed. However, since trap entrance 310 will typically be rectangular in cross-section and since circular flexible plastic tubing is commercially available and cost effective for use as conduit 320, transition 315 typically converts a circular path of conduit 320 to a rectangular entrance 310. Transition 315 may be made of metal, plastic, wood, or any other conventional material, but is typically made of sheet metal or molded plastic.

Trap entrance arrangement 300 may be used to capture many different kinds of animals, including flying animals and ground-dwelling animals, but is particularly applicable to capturing ground-dwelling animals, such as rodents, squirrels, opossums, groundhogs, beaver, and feral cats. For instance, conduit 320 may be attached to the entrance of a lair of one of these ground-dwelling animals and present what appears to an animal, for example, due to the free flow of air through conduit 320, transition 315, and trap 305, to be a means of egress. Bait may be placed in enclosure 312 to further lure an animal through conduit 320 and into trap 305.

The present invention provides a method and apparatus for humanely capturing animals, such as, rodents, birds, and other small animals. One aspect of the present invention provides a door locking mechanism for a trap that is easily activated and prevents the door from being opened by the trapped animal. Compared to the prior art, the structure of the door locking mechanism is also amenable to cost-effective manufacture on a commercial scale. Another aspect of the present invention provides a pathway for directing animals to the entrance of a trap. This aspect of the invention is particularly effective in capturing ground-dwelling animals exiting enclosures.

While the invention has been particularly shown and described with reference to preferred aspects, it will be understood by those skilled in the art that various changes in form and details may be made to the invention without departing from the spirit and scope of the invention described in the following claims.

What is claimed is:

1. A door mechanism for an animal trap, comprising:
   a door having a top and a bottom, the door pivotably mounted to an enclosure and having a ledge, the door having an open position and a closed position;
   at least one bar pivotally mounted above the door;
   means for holding the at least one bar in a first position when the door is in the open position; and
   means for restraining the door in the open position;
   wherein when the means for restraining the door is released, the door pivotally deflects to the closed position and the at least one bar pivotally deflects in a direction generally transverse the enclosure to a second position whereby the at least one bar engages the ledge on the door and prevents the door from being opened.

2. The door mechanism as recited in claim 1, wherein the at least one bar comprises at least two bars.

3. The door mechanism as recited in claim 1, wherein the first position of the at least one bar comprises a generally horizontal position.

4. The door mechanism as recited in claim 1, wherein when the door is in the closed position, the door is inclined.

5. The door mechanism as recited in claim 1, wherein when the door is in the closed position, the door comprises an inclined portion and a vertical portion.

6. The door mechanism as recited in claim 1, wherein when the door is in the closed position, the ledge is generally horizontal.

7. The door mechanism as recited in claim 1, wherein the second position of the at least one bar comprises a generally vertical position.

8. The door mechanism as recited in claim 1, wherein when the door is in the closed position the ledge is generally horizontal and wherein the second position of the at least one bar is a generally vertical position and the end of the at least one bar bears against the ledge of the door to prevent the door from opening.

9. The door mechanism as recited in claim 1, wherein the means for holding the at least one bar in a first position comprises the door.

10. The door mechanism as recited in claim 1, wherein the means for restraining the door in the open position comprises a linkage mechanism connected to a release mechanism.

11. An animal trap comprising:

an enclosure having a top, a bottom, side walls, and an entrance;

a door having a top and a bottom, the door pivotably mounted to the side walls adjacent the entrance and the door having a ledge;

at least one bar pivotably mounted above the door;

means for holding the at least one bar in a first position;

means for restraining the door in an open position; and means for releasing the door when an animal enters the enclosure;

wherein, when the means for restraining the door is released, the door closes and the at least one bar pivotably deflects in a direction generally transverse the enclosure to a second position and engages the ledge of the door and prevents the door from opening.

12. The trap as recited in claim 11, wherein the at least one bar comprises at least two bars.

13. The trap as recited in claim 11, wherein when the door is closed, the door is inclined.

14. The trap as recited in claim 11, wherein the first position of the at least one bar comprises a generally horizontal position.

15. The trap as recited in claim 11, wherein when the door is closed, the ledge is generally horizontal and wherein the second position of the at least one bar is a generally vertical position and the end of the at least one bar bears against the ledge of the door to prevent the door from opening.

16. The trap as recited in claim 11, wherein the means for restraining the door in the open position comprises a linkage mechanism connected to a release mechanism.

17. The door mechanism as recited in claim 11, wherein the means for holding the at least one bar in a first position is the door.

18. A method of trapping animals using a trap having an enclosure and a door mechanism, the door mechanism comprising:

a door having a top and a bottom, the door pivotably mounted at the top to the enclosure and having a ledge, the door having an open position and a closed position;

at least one bar pivotably mounted above the door;

means for holding the at least one bar in a generally horizontal position above the door when the door is in the open position; and means for restraining the door in the open position, the means for restraining being operatively connected to a release mechanism in the enclosure;

the method comprising:

restraining the door in the open position;

attracting an animal into the enclosure whereby the animal contacts and activates the release mechanism;

closing the door;

pivotally rotating the at least one bar in a direction generally transverse the enclosure from a generally horizontal position to a generally vertical position; and preventing the door from opening by engaging the ledge of the door with the at least one bar.

19. The method as recited in claim 18, wherein both closing the door and pivotally rotating the at least one bar is practiced using only gravity.

20. The method as recited in claim 18, wherein the at least the one bar comprises at least two bars.

21. The door mechanism as recited in claim 1, wherein the at least one bar pivotally mounted above the door comprises at least one bar pivotally mounted to the enclosure.

22. The animal trap as recited in claim 11, wherein the at least one bar pivotally mounted above the door comprises at least one bar pivotally mounted to the enclosure.

23. The method as recited in claim 18, wherein the at least one bar pivotally mounted above the door comprises at least one bar pivotally mounted to the enclosure.

24. The door mechanism as recited in claim 1, wherein when the at least one bar pivotably deflects to a second position and engages the ledge of the door the at least one bar slidably engages the ledge of the door.

25. The animal trap as recited in claim 11, wherein when the at least one bar pivotably deflects to a second position and engages the ledge of the door the at least one bar slidably engages the ledge of the door.

26. The method as recited in claim 18, wherein preventing the door from opening by engaging the ledge of the door comprises preventing the door from opening by slidably engaging the ledge of the door.

27. The door mechanism as recited in claim 1, wherein the ledge comprises a shelf extending at least partially across the width of the door.

28. The animal trap as recited in claim 11, wherein the ledge comprises a shelf extending at least partially across the width of the door.

29. The method as recited in claim 18, wherein the ledge comprises a shelf extending at least partially across the width of the door.

* * * * *

UNITED STATES PATENT AND TRADEMARK OFFICE
CERTIFICATE OF CORRECTION

PATENT NO. : 6,618,982 B2  Page 1 of 1
DATED : September 16, 2003
INVENTOR(S) : Lafforthun It is certified that error appears in the above-identified patent and that said Letters Patent is hereby corrected as shown below:

Column 9,
Line 3, delete the word "door mechanism" and insert -- trap --

Signed and Sealed this

Thirtieth Day of December, 2003

JAMES E. ROGAN
*Director of the United States Patent and Trademark Office*